US012798193B2

(12) United States Patent
Reidl et al.

(10) Patent No.: US 12,798,193 B2
(45) Date of Patent: Nov. 17, 2026

(54) FLOW MODIFICATION ELEMENT, FLOW DEVICE AND FLOW METHOD FOR AN ADDITIVE MANUFACTURING DEVICE

(71) Applicant: EOS GMBH ELECTRO OPTICAL SYSTEMS, Krailling (DE)

(72) Inventors: Mario Reidl, Munich (DE); Sebastian Mehl, Olching (DE); Vincenzo Abbatiello, Gilching (DE); Maximilian Kraatz, Munich (DE); Maximilian Mittermüller, Munich (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 115 days.

(21) Appl. No.: 18/840,900

(22) PCT Filed: Feb. 24, 2023

(86) PCT No.: PCT/EP2023/054690
§ 371 (c)(1),
(2) Date: Aug. 22, 2024

(87) PCT Pub. No.: WO2023/161422
PCT Pub. Date: Aug. 31, 2023

(65) Prior Publication Data

US 2025/0196441 A1 Jun. 19, 2025

(30) Foreign Application Priority Data

Feb. 25, 2022 (DE) ......................... 102022201999.7

(51) Int. Cl.
*B29C 64/371* (2017.01)
*B22F 10/322* (2021.01)
(Continued)

(52) U.S. Cl.
CPC .......... *B29C 64/371* (2017.08); *B22F 10/322* (2021.01); *B22F 12/70* (2021.01);
(Continued)

(58) Field of Classification Search
CPC ...................................................... B22F 10/70
See application file for complete search history.

(56) References Cited

U.S. PATENT DOCUMENTS

2017/0216916 A1* 8/2017 Nyrhilä ................. B22F 10/322
2018/0126460 A1 5/2018 Murphree et al.
(Continued)

FOREIGN PATENT DOCUMENTS

DE 102014205875 A1 10/2015
DE 102018215301 A1 3/2020
(Continued)

OTHER PUBLICATIONS

PCT Application No. PCT/EP2023/054690, International Search Report dated May 8, 2023.

*Primary Examiner* — Virak Nguon
(74) *Attorney, Agent, or Firm* — Polsinelli PC

(57) ABSTRACT

Disclosed is a flow modification element including a gas guide element extending from a gas inlet side to a gas outlet side and a plurality of channels. The channels are spaced apart such that the number of second channels is arranged closer to the build area in a direction perpendicular to the build area than the number of first channels. A total opening cross-sectional area of the number of first channels on the gas outlet side differs from a total opening cross-sectional area of the number of second channels on the gas outlet side, and the total opening cross-sectional areas of the number of first channels and of the number of second channels on the gas inlet sides are substantially equal. Or, at least a partial gas flow introduced into the process chamber from the
(Continued)

number of first channels is directed towards a plane of the build area.

20 Claims, 7 Drawing Sheets

(51) Int. Cl.

| | |
|---|---|
| ***B22F 12/70*** | (2021.01) |
| ***B28B 1/00*** | (2006.01) |
| ***B29C 64/153*** | (2017.01) |
| ***B33Y 10/00*** | (2015.01) |
| ***B33Y 40/00*** | (2020.01) |

(52) U.S. Cl.

CPC ............ *B28B 1/001* (2013.01); *B29C 64/153* (2017.08); *B33Y 10/00* (2014.12); *B33Y 40/00* (2014.12)

(56) References Cited

U.S. PATENT DOCUMENTS

| | | | | |
|---|---|---|---|---|
| 2019/0322051 | A1* | 10/2019 | Wakelam ............... | B33Y 10/00 |
| 2019/0366434 | A1* | 12/2019 | Upadhye ................ | B33Y 30/00 |
| 2020/0061655 | A1* | 2/2020 | Wakelam .............. | B29C 64/153 |
| 2021/0094234 | A1 | 4/2021 | Patel et al. | |

FOREIGN PATENT DOCUMENTS

| | | | |
|---|---|---|---|
| DE | 102018219304 | A1 | 5/2020 |
| EP | 3015197 | B1 | 5/2016 |

* cited by examiner

FLOW MODIFICATION ELEMENT, FLOW DEVICE AND FLOW METHOD FOR AN ADDITIVE MANUFACTURING DEVICE

TECHNICAL FIELD OF THE INVENTION

The present invention relates to a flow modification element and a flow device for an additive manufacturing device, as well as to a flow method and an additive manufacturing method.

BACKGROUND OF THE INVENTION

Devices and methods of this type are used in rapid prototyping, rapid tooling or additive manufacturing, for example. One example of such a method is known as "selective laser sintering or laser melting". In this method, a thin layer of a building material in powder form is repeatedly applied and the building material is selectively solidified in each layer by selectively irradiating locations corresponding to a cross-section of the object to be manufactured with a laser beam.

The energy input during selective solidification can create impurities such as splatter, smoke, vapors and gases that spread into the process chamber from a build area in which selective solidification is carried out. In addition, when using a building material in powder form, impurities can be created by powder or powder dust being whirled up in the process chamber. Impurities can have a negative effect on the manufacturing process, for example by absorbing, scattering or deflecting the scanning laser beam, by depositing on a coupling window for the laser beam or depositing on a building material layer. In order to meet high quality and efficiency requirements for the manufacturing process, such impurities must therefore be removed from the process chamber as quickly as possible. For this purpose, a gas flow is usually generated in the process chamber that transports impurities out of the process chamber.

DE 10 2018 215 301 A1 describes an additive manufacturing device with a flow device for generating a gas flow in the manufacturing device. A gas inlet element for introducing the gas flow into the process chamber comprises a plurality of channels penetrating a body of the gas inlet element from a gas inlet side to a gas outlet side.

DE 10 2018 219 304 A1 describes an additive manufacturing device with a flow device comprising a gas supply line provided outside a process chamber of the manufacturing device for introducing gas into the process chamber through a gas inlet. The gas supply line comprises a line section adjoining the gas inlet that extends over a length at least as great as one half of the width of the line section and that comprises a flow conditioning unit for aligning the gas flow in an extension direction of the line section.

US 2018/0126460 A1 describes a device for 3D printing, wherein a three-dimensional object can be produced on a platform, and a gas inlet portion and a gas outlet portion are provided for generating a gas flow at or near the platform surface. The gas inlet portion comprises a baffle for deflecting the gas flow, and the gas outlet portion has a shape tapering towards an outlet opening.

SUMMARY OF THE INVENTION

It is an object of the present invention to provide an alternative or improved flow modification element and an alternative or improved flow device for an additive manufacturing device, as well as an alternative or improved additive manufacturing device, an alternative or improved flow method and an alternative or improved additive manufacturing method, with which, in particular, the effectiveness of the removal of impurities from the process chamber can be increased.

This object is solved by a flow device, a flow modification element, an additive manufacturing device, a flow method, and a manufacturing method. The methods can also be further developed by the features below or the features of the devices. The features of the devices can also be used among one another for further development. The features of the methods can also be used among one another for further development.

A flow device according to a first aspect of the invention is used for a manufacturing device for additive manufacturing of a three-dimensional object by selectively solidifying a building material layer by layer in a build area within a process chamber of the manufacturing device. The flow device comprises a gas supply device for generating a gas flow at least in the process chamber, a supply line for supplying the gas flow to the process chamber and a flow modification element for introducing the gas flow from the supply line into the process chamber. The flow modification element comprises a gas inlet side facing the supply line, a gas outlet side facing away from the supply line, at least one first gas guide element extending from the gas inlet side to the gas outlet side and a plurality of channels, each of the channels allowing a transport of gas from the gas inlet side to the gas outlet side, wherein a number of first channels and a number of second channels are at least partially defined by the first gas guide element, which are spaced apart from each other such that the number of second channels is arranged closer to the build area in a direction perpendicular to the build area than the number of first channels, and wherein the first gas guide element is configured such that a total opening cross-sectional area associated with the number of first channels on the gas outlet side differs from a total opening cross-sectional area associated with the number of second channels on the gas outlet side, and a total opening cross-sectional area associated with the number of first channels on the gas inlet side and a total opening cross-sectional area associated with the number of second channels on the gas inlet side are substantially equal, and/or wherein the first gas guide element is configured such that at least one partial gas flow, which is introduced into the process chamber from the number of first channels during operation of the flow device, is directed towards a plane of the build area.

The process chamber is understood to be a cavity that is partially bounded by the build area and preferably comprises the build area for building the object. Preferably, the build area forms part of a bottom area on a lower side of the process chamber. The process chamber can be a substantially closed cavity with the exception of a gas inlet, formed for example by the flow modification element, and a gas outlet and possibly further gas inlets and/or gas outlets during operation.

The flow modification element can be provided in a wall of the process chamber that delimits the interior of the process chamber and thus encloses the cavity. For example, it can be offset from the process chamber or protrude into the process chamber or be set back. Preferably, the flow modification element is configured and/or arranged such that a main extension direction of the channels between the gas inlet side and the gas outlet side, or a longitudinal direction of the flow modification element, and/or a mean outflow direction in which the gas enters the process chamber during operation of the flow device is substantially perpendicular to a plane of the process chamber wall and/or substantially parallel to a plane of the build area and/or a width direction of the flow modification element is substantially horizontal and/or parallel to a nearest build area side (in particular in the case of a rectangular build area). A width direction of the flow modification element can in particular be transverse, preferably perpendicular, to the longitudinal direction of the flow modification element. Preferably, a dimension of the flow modification element in the width direction is at least as large as a maximum dimension of the build area in the width direction. Preferably, a dimension of the flow modification element in the width direction is a multiple of a dimension of the flow modification element in a height direction perpendicular to the longitudinal and height directions. In a plane of the process chamber wall or parallel to the process chamber wall, the channels can in particular be arranged in a grid shape, i.e. in the form of rows and columns above and below one another. The rows and/or columns can also be offset from one another.

The supply line is preferably a rigid, i.e. non-flexible, line or a rigid duct, e.g. a metal duct. In particular, the supply line can be configured in accordance with the features described further below. The gas supply device can, for example, comprise a drive means for moving a volume of gas, e.g. a blower. The process chamber and the supply line can form a closed process gas circuit-if necessary, with further elements, such as a gas discharge line for discharging gas from the process chamber. A gas flow is preferably understood to be a volume of gas that is specifically moved in a preferred direction.

Preferably, the gas supply to the process chamber is formed entirely by the supply line and the flow modification element. In other words, during operation of the flow device, the gas flow is introduced directly from the supply line through the flow modification element into the process chamber. Preferably, the gas supply to the process chamber is free of further flow-modifying elements between the supply line and the flow modification element and between the flow modification element and the process chamber, in particular the interior of the process chamber. The channels preferably form substantially the only connections permeable to the gas through the flow modification element from its gas inlet side to the gas outlet side.

The fact that the gas guide element at least partially defines the number of first channels and the number of second channels means, in particular, that the gas guide element at least partially delimits the number of first channels and the number of second channels. Further elements of the flow modification element, in particular further gas guide elements and/or a wall of the flow modification element, can be provided for defining or bounding the channels. In particular, a number of channels means at least one channel, i.e. a single channel or also several channels.

In particular, the number of first channels can comprise a plurality of channels arranged in a row next to each other, and the number of second channels can comprise a plurality of second channels arranged in a row next to each other, wherein the row of first channels and the row of second channels are arranged substantially parallel to each other and one above the other with respect to the build area. It is not excluded here that the channels of the first row are offset relative to each other, or that the channels of the second row are offset relative to each other, or that the first channels are offset relative to the second channels. This embodiment applies analogously to the third channels described below and their arrangement in relation to the first and second channels. The first gas guide element can thus in particular divide the number of first and second channels in a direction parallel to the plane of the build area, i.e. preferably horizontally. The first gas guide element is preferably a gas guide element arranged substantially parallel to the plane of the build area, i.e. preferably horizontally. Preferably, the first gas guide element extends substantially over an entire length and width of the flow modification element parallel to the plane of the build area.

A total opening cross-sectional area associated with the number of first (also: second or third) channels on the gas inlet side can, for example, be defined as the sum of the opening areas of the respective channels on the gas inlet side. Similarly, a total opening cross-sectional area associated with the number of first (also: second or third) channels on the gas outlet side can be defined, for example, as the sum of the opening areas of the respective channels on the gas outlet side. In the event that one or more of the channels do not extend completely to the gas inlet side and/or gas outlet side, the total opening cross-sectional area associated with the respective channels on the gas inlet side and/or gas outlet side can be defined by the first and/or second gas guide element that at least partially defines the respective channels, and/or any other structures of the flow modification element, in particular its wall. In particular, the assigned total opening cross-sectional area in this case can be an opening area of a slit-shaped opening defined by the first and/or second gas guide element on the gas inlet or gas outlet side of the flow modification element. The case in which one or more of the channels do not extend completely to the gas inlet side and/or gas outlet side can occur in particular if the flow modification element, as described in detail below, further comprises at least a third gas guide element that extends substantially perpendicular to a plane of the build area and ends at a distance from the gas inlet side and/or gas outlet side, in particular at a distance from the gas outlet side.

An opening area of a channel on the gas inlet side or gas outlet side can be defined as the area enclosed by the gas guide element(s) delimiting the channel on the gas inlet side or gas outlet side and any wall of the flow modification element.

Alternatively or additionally, an opening area of a channel can be defined as the cross-sectional area of the channel in a plane perpendicular to the longitudinal direction of the flow modification element and/or perpendicular to the plane of the build area, and/or by a projection of the gas guide elements onto this plane.

In the event that the build area is part of a bottom area of the process chamber, the flow modification element can in particular be arranged in a vertical direction above the build area. A partial gas flow directed towards the plane of the build area therefore refers in particular to a partial gas flow directed downwards. An angle that is formed by the partial gas flow directed towards the build area with the horizontal or with a plane parallel to the build area can, for example, be at least 5°, preferably at least 10°, particularly preferably at least 15° and/or at most 30°, preferably at most 25°, particularly preferably at most 20°.

Because the total opening cross-sectional area of the number of first and second channels on the gas inlet side is substantially the same, a substantially equal volume flow of the gas can pass through the number of first and second channels. In other words, an incoming gas volume is divided into substantially equal volume parts between the first and second channels. Due to the differing total opening cross-sectional areas on the gas outlet side, the outflow velocities of the partial gas volumes introduced into the process chamber from the first channels and the second channels can be set independently of each other and, in particular, differing from each other. The fact that the partial gas flow introduced into the process chamber through the first (upper) channels is directed downwards towards the build area can, for example, achieve that the overall gas flow can be concentrated. Overall, the embodiment of the flow modification element described above can achieve improved homogenization of the gas flow introduced into the process chamber, in particular by reducing vortexes or turbulence occurring in the gas flow.

Preferably, the flow modification element further comprises a second gas guide element extending from the gas inlet side to the gas outlet side and at least partially defining a number of third channels, wherein the number of third channels is spaced apart from the number of first channels and the number of second channels such that the number of third channels is arranged closer to the build area in a direction perpendicular to the build area than the number of second channels.

Preferably, the second gas guide element is a gas guide element arranged substantially parallel to the plane of the build area, i.e. preferably horizontally, and/or substantially parallel to the first gas guide element. Preferably, the second gas guide element extends substantially over an entire length and width of the flow modification element parallel to the plane of the build area. The first and second gas guide elements can, for example, also be referred to as horizontal intermediate walls of the flow modification element. Together with the first gas guide element, the second gas guide element preferably defines or delimits a number of first, second and third channels which are arranged one above the other perpendicular to the build area, i.e. the first channels are arranged at the top, the second channels in the middle, and the third channels at the bottom, with the first gas guide element dividing the number of first and second channels and the second gas guide element dividing the number of second and third channels. In this way, three levels of channels located one above the other are provided. As a result, for example, differentiated partial gas flows can be defined, which are introduced into the process chamber separately from one another through the flow modification element and together form a total gas flow in the process chamber, which flows at least through certain areas of the process chamber. This subdivision of the introduced total gas flow into individual partial gas flows enables, for example, targeted optimization of the individual partial gas flows with regard to their velocity and/or direction when flowing into the process chamber.

Preferably, the first gas guide element and the second gas guide element are configured such that the total opening cross-sectional area associated with the number of second channels on the gas outlet side is greater than the total opening cross-sectional area associated with the number of first channels on the gas outlet side and/or a total opening cross-sectional area associated with the number of third channels on the gas outlet side. Further preferably, a total opening cross-sectional area associated with the number of first channels on the gas inlet side and/or a total opening cross-sectional area associated with the number of second channels on the gas inlet side and/or a total opening cross-sectional area associated with the number of third channels on the gas inlet side is substantially the same. Alternatively or additionally, the first gas guide element and the second gas guide element are further preferably configured such that the total opening cross-sectional area associated with the number of first and/or second and/or third channels on the gas outlet side is in each case smaller than the total opening cross-sectional area associated with the number of first and/or second and/or third channels on the gas inlet side.

As described above, a uniform total opening cross-sectional area of the first, second and third channels on the gas inlet side can, for example, provide substantially equal partial volumes in the first, second and third channels. Due to the larger design of the total opening cross-sectional area of the number of second channels on the gas outlet side, the partial gas flow flowing into the process chamber through the second channels can have a lower (average) velocity than corresponding partial gas flows flowing in through the number of first and third channels. At the same time, the gas in the middle region can be introduced through as large an area as possible. In conjunction with the first partial gas flow coming from above, this can increase the homogeneity of the overall flow in the process chamber, in particular by reducing occurring turbulence. A reduction in the cross-sectional area of the channel from the gas inlet side to the gas outlet side can, for example, accelerate the gas flow.

For example, the total opening cross-sectional area associated with the number of second channels on the gas outlet side can be substantially 1.3 times to 2.5 times the total opening cross-sectional area associated with the number of first channels and/or the number of third channels on the gas outlet side. A total opening cross-sectional area associated with the respective number of channels on the gas outlet side can, for example, be in the range of 50% to 99% in relation to the total opening cross-sectional area associated with the respective number of channels on the gas inlet side, for the number of first and/or third channels, for example, in particular in the range of 50% to 70%, and for the number of second channels, for example, in the range of 90% to 98%.

Preferably, the first and/or the second gas guide element comprises a first portion adjacent to the gas inlet side, which has a shape tapering towards the gas inlet side, and/or a second portion adjacent to the gas outlet side, which has a shape tapering towards the gas outlet side. Further preferably, an extension of the first portion between the gas inlet side and the gas outlet side is greater than an extension of the second portion between the gas inlet side and the gas outlet side. Alternatively or additionally, an expansion angle of the second portion is further preferably greater than an expansion angle of the first portion. Alternatively or additionally, the first gas guide element and/or the second gas guide element further preferably extends over an entire extension of the flow modification element from the gas inlet side to the gas outlet side.

The tapering portions are further preferably configured to be substantially stepless, i.e. they taper in a strictly monotonical manner and preferably with a smooth surface. This makes it possible, for example, to avoid corners and/or edges in the flow path where turbulence can occur, and thus an overall homogenization of the gas flow can be achieved.

An expansion angle can be defined, for example, as an angle that tangents to opposite sides or surfaces (e.g. the top side and the bottom side) of the respective gas guide element form with one another. Alternatively or additionally, an expansion angle can be defined, for example, as an angle that straight lines that represent the average slope of the opposite sides or surfaces (e.g. top side and bottom side) of the gas guide element form with each other. This definition is therefore preferably based on the slope or average slope of the tapering portions. The actual slope of the tapering portions can be linear or generally follow any strictly monotonic function, i.e. be curved.

In general, a gas guide element is preferably configured such that it has a first cross-section at a first end facing the gas inlet side, widens along the first portion to a second cross-section, the area of which is larger than that of the first cross-section, and tapers along the second portion towards the gas outlet side to a second end to assume a third cross-section, an area of the third cross-section being smaller than that of the second cross-section.

Preferably, the third gas guide element is substantially configured in the shape of a drop, with one tip of the drop shape facing the gas inlet side. The tip on the gas inlet side can be flattened.

The embodiments of the gas guide element described herein can be applied not only to the first and/or second gas guide element, but also to further gas guide elements of the flow modification element, in particular one or more third gas guide element(s) described further below.

An expansion angle of the first and/or second portion can be in the range of 1° to 3°, for example.

Preferably, the flow modification element further comprises at least a third gas guide element extending substantially perpendicular to a plane of the build area. Further preferably, the third gas guide element extends from the gas inlet side in the direction of the gas outlet side of the flow modification element and ends at a distance from the gas outlet side and/or the third gas guide element extends over a length which corresponds to at most two thirds of the extension of the flow modification element from the gas inlet side to the gas outlet side.

Alternatively or additionally, it is further preferred that the third gas guide element comprises a first portion adjacent to the gas inlet side, which has a shape tapering towards the gas inlet side, and/or a second portion provided downstream of the first portion, which has a shape tapering towards the gas outlet side, wherein preferably an extension of the first portion between the gas inlet side and the gas outlet side is greater than an extension of the second portion between the gas inlet side and the gas outlet side and/or wherein preferably an expansion angle of the second portion is greater than an expansion angle of the first portion.

Preferably, the at least one third gas guide element is a gas guide element arranged substantially perpendicular to the plane of the build area, i.e. preferably vertically. Preferably, the at least one third gas guide element extends substantially over an entire height of the flow modification element perpendicular to the plane of the build area. The third gas guide element can, for example, also be referred to as a vertical intermediate wall of the flow modification element. The at least one third gas guide element preferably divides each of the number of first, second and third channels into a plurality of channels arranged next to each other parallel to the build area. Preferably, a plurality of third gas guide elements is provided in order to define a horizontal subdivision of the flow modification element into channels.

Such a horizontal subdivision of the flow modification element can, for example, further improve the gas flow flowing through the flow modification element, in particular by more clearly defining a portioning of the volume flow along a side of the build area extending transversely to the main flow direction, preventing an influence on the gas flow in neighboring channels, and limiting the size of any turbulence to the individual channels.

Because the third gas guide element ends at a distance from the location of the gas outlet on the gas outlet side, the partial gas volumes subdivided by the channels can, for example, be reunited at least horizontally before entering the process chamber. The tapering portions of the third gas guide element are further preferably configured to be substantially stepless, i.e. they taper in a strictly monotonical manner and preferably with a smooth surface. This makes it possible, for example, to avoid corners and/or edges in the flow path where turbulence can occur, thus achieving an overall homogenization of the gas flow.

Overall, the tapering shape of the third gas guide element and/or the fact that it ends at a distance from the gas outlet side can, for example, reduce the occurrence of turbulence in the gas flow introduced into the process chamber through the flow modification element, i.e. it can in particular have a turbulence-reducing effect. Preferably, a first gas flow flowing through the flow modification element, in which the third gas guide element(s) extends to the gas outlet side and/or does not have a substantially droplet-like shape, has a first measure of turbulence, and a second gas flow flowing through the flow modification element, in which the third gas guide element(s) ends at a distance from the gas outlet side and/or has a substantially droplet-like shape, has a second measure of turbulence, wherein the second measure of turbulence is smaller than the first measure of turbulence. A measure of turbulence can, for example, be vortexes of the gas flow and/or a measure of a local and/or temporal inhomogeneity of the flow properties of the gas flow.

Preferably, the first and/or the second gas guide element is formed as a substantially horizontally arranged flat body and/or the third gas guide element is formed as a substantially vertically arranged flat body. Further preferably, at least the flat body, further preferably the entire flow modification element, is manufactured in an additive manufacturing method.

In particular, a flat body is a body which substantially has a first main extension direction and a second main extension direction, and which extends perpendicular to the first and second main extension directions over a thickness that is several times smaller than the dimensions of the body in the first and second main extension directions. Here, the thickness of the flat body need not be constant. In particular, the tapering shape of the gas guide element(s) described above can be formed over the thickness extension of the flat body.

Manufacturing the flow modification element or at least its gas guide elements in an additive manufacturing method can, for example, enable the desired geometries to be produced very precisely in a simple and/or fast manner.

A flow modification element according to the invention serves for a manufacturing device for additively manufacturing a three-dimensional object by selectively solidifying a building material layer by layer in a build area within a process chamber of the manufacturing device, wherein the flow modification element is configured to introduce a gas flow from a supply line into the process chamber. The flow modification element comprises a gas inlet side facing the supply line, a gas outlet side facing away from the supply line, at least a first gas guide element extending from the gas inlet side to the gas outlet side and a plurality of channels, each of the channels allowing a transport of gas from the gas inlet side to the gas outlet side. A number of first channels and a number of second channels are at least partially defined by the first gas guide element, which are spaced apart such that the number of second channels is arranged closer to the build area in a direction perpendicular to the build area than the number of first channels, and the first gas guide element is configured such that a total opening cross-sectional area associated with the number of first channels on the gas outlet side differs from a total opening cross-sectional area associated with the number of second channels on the gas outlet side, and a total opening cross-sectional area associated with the number of first channels on the gas inlet side and a total opening cross-sectional area associated with the number of second channels on the gas inlet side are substantially equal. Alternatively or additionally, the first gas guide element is configured such that at least a partial gas flow, which is introduced into the process chamber from the number of first channels during operation of the flow device, is directed towards a plane of the build area.

In particular, the flow modification element can be further developed according to one or more of the features described above in relation to the flow device. Thus, for example, a flow modification element can be provided with which an existing flow device or additive manufacturing device can be equipped and/or retrofitted.

A flow device according to a second aspect of the invention serves for a manufacturing device for additively manufacturing of a three-dimensional object by selectively solidifying a building material layer by layer in a build area within a process chamber of the manufacturing device. The flow device comprises a gas supply device for generating a gas flow at least in the process chamber, a supply line for supplying the gas flow to the process chamber and a flow modification element for introducing the gas flow from the supply line into the process chamber. The supply line comprises at least a first line section which is spaced from the flow modification element and which is formed substantially in an s-shape and/or z-shape, and the supply line comprises at least a second line section, which is provided between the first line section and the flow modification element, preferably directly adjoining the first line section and the flow modification element, respectively, and which extends along a first extension direction that is substantially parallel to a plane of the build area over a length that is at least as great as five times, preferably at least as great as ten times, a height, preferably an average height, of the second line section transverse to the first extension direction and substantially perpendicular to a plane of the build area.

In particular, the flow device according to the second aspect can be further developed by one or more of the features described above in relation to the flow device of the first aspect.

An average height of the second line section can be used, in particular in the case that a height of the second line section is not constant over its length, to define the ratio of the length to the height of the second line section. A non-constant height of the second line section may, for example, be due to the fact that a sub-section connecting the first and second line sections, in particular a curved sub-section, extends into the second line section. Preferably, however, such a connecting section is not considered to be part of the second line section, so that the height of the second line section is constant over its entire length.

In particular, the s-shape and/or z-shape of the supply line can be formed in a plane substantially perpendicular to the plane of the build area of the manufacturing device and/or in relation to a vertical direction.

The s-shape or z-shape of the first line section can, for example, provide the longest possible flow distance for the gas flow to be introduced into the process chamber, wherein a space requirement of the first line section (in a horizontal direction) in the additive manufacturing device can be minimized at the same time by the s-shape or z-shape. In general, a long flow length of the gas flow before it is introduced into the process chamber can cause a flow calming or flow homogenization of the gas flow, in particular in combination with the second line section, which is provided directly upstream of the process chamber, i.e., the flow modification element, and in which the gas flow substantially no longer undergoes a change in direction.

Preferably, the second line section extends along its first extension direction over a length which is at least as great as half a width of the second line section transverse to the first extension direction and substantially parallel to a plane of the build area. Further preferably, the length of the second line section is at least as great as the width of the second line section, still further preferably at least one and a half times greater, still further preferably at least two times greater, particularly preferably at least three times greater than the width of the second line section.

This can, for example, provide a sufficient flow length of the gas flow directly upstream of the gas inlet or flow modification element, which can cause a flow calming or flow homogenization of the gas flow.

Preferably, the first line section comprises at least a first sub-section (41*a*) and at least a second sub-section, which are arranged substantially parallel to one another and/or parallel to a plane of the build area and/or which are in fluidic communication with one another via a curved sub-section of the first line section, wherein a total length of the first line section, which comprises at least a first length of the first sub-section and a second length of the second sub-section in a direction substantially parallel to a plane of the build area, preferably parallel to the first extension direction, is at least as great as three times, preferably ten times, a width of the flow modification element and/or of the second line section transverse to the first extension direction and substantially parallel to a plane of the build area.

The phrase "in fluidic communication" refers in particular to a gas-conducting connection between the two line sections during operation. The curved sub-section can, for example, realize the s-shape or z-shape of the supply line, thus reducing the space requirement of the supply line.

Preferably, a cross-section of the second line section in a plane transverse to the first extension direction is substantially as large as a cross-section of the flow modification element on a gas inlet side of the flow modification element adjoining the second line section, and/or has substantially the same geometric shape, in particular a rectangular shape.

This can, for example, reduce or avoid turbulence in the gas flow when it enters the flow modification element.

Preferably, in a direction parallel to the plane of the build area, a width of at least a sub-section of the first line section adjoining the second line section is substantially equal to the width of the second line section, wherein the sub-section of the first line section further preferably comprises at least two thirds of a total extension of the first line section.

In other words, it is preferable to provide a line section that is as long as possible and in which the width does not change. This can, for example, lead to a further improvement in the flow properties, e.g. homogenization, of the gas flow.

Preferably, in a direction perpendicular to the plane of the build area, a height of the first line section decreases towards the second line section, preferably decreases continuously or stepwise, and/or a height of the second line section is substantially constant in a direction perpendicular to the plane of the build area.

By reducing the cross-sectional height in this way, in particular while maintaining the same cross-sectional width, an overall reduction in cross-section can be achieved, which in turn can lead to an increase in the flow velocity of the gas flow passing through the first line section during operation of the flow device.

As described above, the first line section can comprise at least a first sub-section and at least a second sub-section that are arranged substantially parallel to each other and/or parallel to a plane of the build area and/or which are in fluidic communication with one another via a curved sub-section of the first line section. In this case, it is particularly preferred that the first sub-section is spaced further apart from the second line section than the second sub-section, and the first sub-section has a first height and the second sub-section has a second height smaller than the first height of the first sub-section. Further preferably, the height of the second line section is smaller than the second height of the second sub-section. The first height of the first sub-section and/or the second height of the second sub-section and/or the height of the second line section is preferably constant in each case. Thus, according to this preferred embodiment, the height of the supply line decreases stepwise from one section of the supply line to the next section located downstream.

Preferably, in the flow device according to the first and/or second aspect, the flow modification element is provided substantially in a lower height region of the process chamber.

In other words, the gas flow is preferably introduced in a height region of the process chamber close to the build area. Further preferably, a gas outlet, through which the gas flow is discharged from the process chamber, is also provided in a lower height region of the process chamber, preferably directly adjacent to the bottom of the process chamber. Overall, the gas flow can thus flow through the process chamber close to the build area, for example, in order to remove any impurities that arise as close as possible to their point of origin and thus, for example, prevent the impurities from spreading into the process chamber as efficiently as possible.

The lower height region of the process chamber can, for example, correspond to a lower third, preferably a lower fifth, particularly preferably a lower tenth of a maximum distance of the build area from a process chamber ceiling.

Alternatively or additionally, the flow modification element or a further gas inlet can be provided in an upper height region of the process chamber for introducing a gas flow.

A manufacturing device according to the invention serves for the additive manufacturing of a three-dimensional object by selectively solidifying a building material layer by layer in a build area within a process chamber and comprises a flow device described above according to the first and/or second aspect, or a flow modification element described above.

This makes it possible, for example, to achieve the effects described above in relation to the flow device also with an additive manufacturing device.

A flow method according to a first aspect of the invention serves for generating a gas flow in a manufacturing device for additively manufacturing a three-dimensional object by selectively solidifying a building material layer by layer in a build area within a process chamber of the manufacturing device. The flow method comprises the following steps:

- generating a gas flow at least in the process chamber using a gas supply device,
- supplying the gas flow to the process chamber via a supply line and
- introducing the gas flow from the supply line via a flow modification element into the process chamber.

The flow modification element comprises a gas inlet side facing the supply line, a gas outlet side facing away from the supply line, at least a first gas guide element extending from the gas inlet side to the gas outlet side and a plurality of channels, each of the channels allowing a transport of gas from the gas inlet side to the gas outlet side. A number of first channels and a number of second channels are at least partially defined by the first gas guide element, which first and second channels are spaced apart from one another such that the number of second channels is arranged closer to the build area in a direction perpendicular to the build area than the number of first channels. The first gas guide element is configured such that a total opening cross-sectional area associated with the number of first channels on the gas outlet side differs from a total opening cross-sectional area associated with the number of second channels on the gas outlet side, and a total opening cross-sectional area associated with the number of first channels on the gas inlet side and a total opening cross-sectional area associated with the number of second channels on the gas inlet side are substantially equal. Alternatively or additionally, the first gas guide element is configured such that at least a partial gas flow, which is introduced from the number of first channels into the process chamber during operation of the flow device, is directed towards a plane of the build area.

A flow method according to a second aspect of the invention serves for generating a gas flow in a manufacturing device for additively manufacturing a three-dimensional object by selectively solidifying a building material layer by layer in a build area within a process chamber of the manufacturing device. The flow method comprises the following steps:

- generating a gas flow at least in the process chamber using a gas supply device,
- supplying the gas flow to the process chamber via a supply line and
- introducing the gas flow from the supply line via a flow modification element into the process chamber.

The supply line comprises at least a first line section, which is spaced from the flow modification element, and which is formed substantially in an s-shape and/or z-shape. The supply line further comprises at least a second line section, which is provided between the first line section and the flow modification element, preferably directly adjoining the first line section and the flow modification element, respectively, and which extends along a first extension direction that is substantially parallel to a plane of the build area over a length that is at least as great as five times, preferably at least as great as ten times, a height, preferably an average height, of the second line section transverse to the first extension direction and substantially perpendicular to a plane of the build area.

A manufacturing method according to the invention serves for additively manufacturing a three-dimensional object in a process chamber of a manufacturing device and comprises the steps of applying a building material layer by layer in a build area, selectively solidifying the applied layer and repeating the steps of layer-wise applying and selectively solidifying until the three-dimensional object is completed, wherein a flow method described above according to the first and/or second aspect is carried out at least temporarily during the manufacture of the three-dimensional object.

This makes it possible, for example, to achieve the effects described above in relation to the flow device and/or the flow modification element and/or the additive manufacturing device also in a flow method and/or in an additive manufacturing method.

BRIEF DESCRIPTION OF THE DRAWINGS

Further features and expediencies of the invention are apparent from the description of exemplary embodiments with reference to the attached drawings.

FIGS. 4*a*, 4*b* and 4*c* show schematic views of a flow modification element of the device shown in FIG. 1, wherein FIG. 4*a* shows a perspective view of the flow modification element, FIG. 4*b* shows a view onto a gas inlet side of the flow modification element, and FIG. 4*c* shows a view onto a gas outlet side of the flow modification element.

DETAILED DESCRIPTION OF THE EMBODIMENTS

Figure 1:
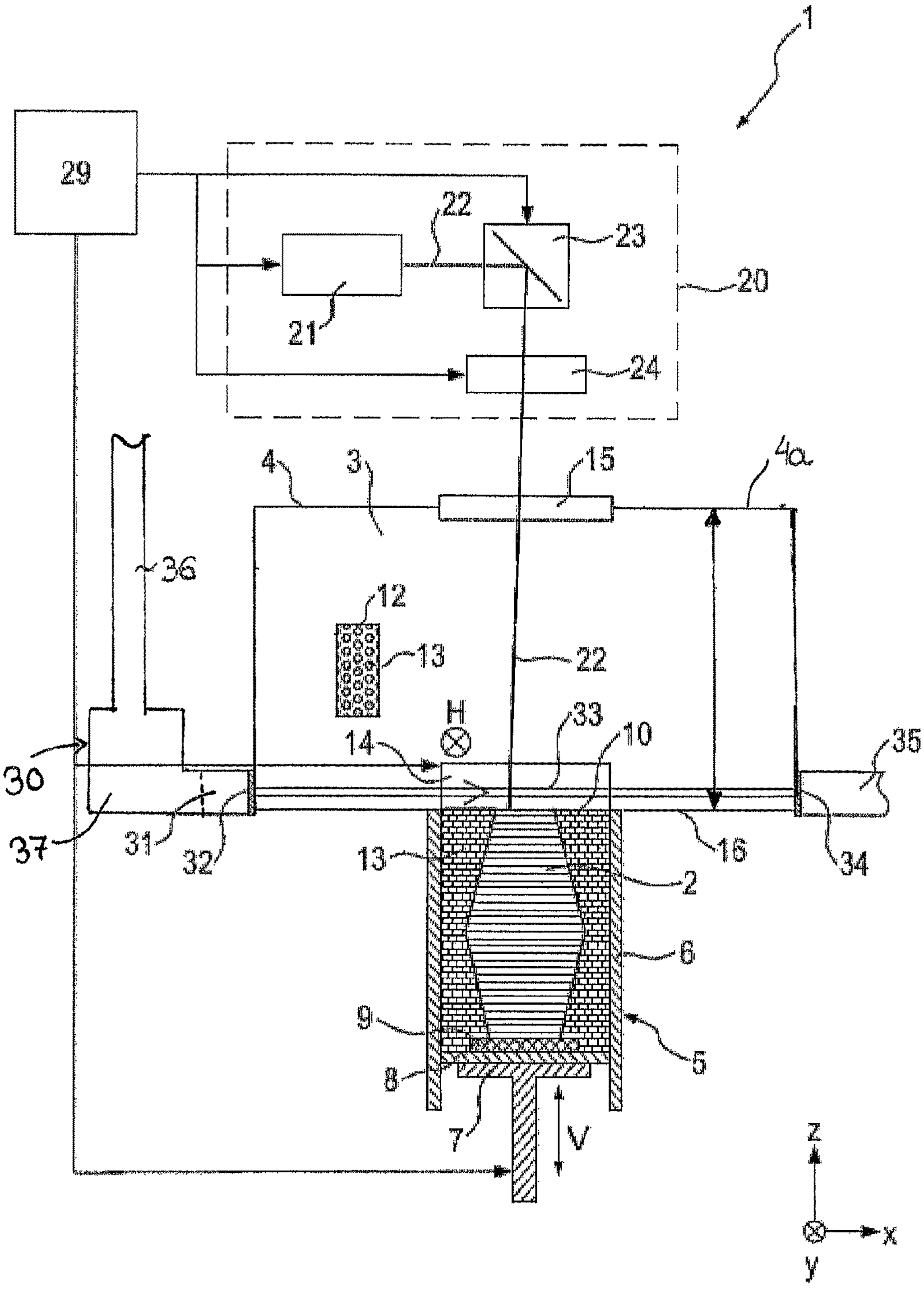
FIG. 1 shows a schematic view, partially depicted in cross-section, of a device for additively manufacturing a three-dimensional object according to an embodiment of the present invention.

In the following, a device according to the present invention is described with reference to FIG. 1. The device shown in FIG. 1 is a laser sintering or laser melting device 1. For building an object 2, the device comprises a process chamber 3 with a chamber wall 4.

A building container 5 that is open to the top and has a container wall 6 is arranged below the process chamber 3. A support 7 movable in a vertical direction V is arranged in the building container 5, to which a base plate 8 is attached, which base plate closes the building container 5 at the bottom and thus forms the bottom thereof. The base plate 8 can be a plate formed separately from the support 7, which is attached to the support 7, or it can be formed integrally with the support 7. Depending on the building material and process used, a building platform 9 can also be attached to the base plate 8 as a building base on which the object 2 is built. However, the object 2 can also be built on the base plate 8 itself, which then serves as a building base.

A working plane 16 is defined by the upper opening of the building container 5, wherein the region of the working plane 16 located within the opening that can be used to build the object 2 is referred to as a build area 10. The working plane 16 can also be the surface of a working plate (not shown in FIG. 1) facing the interior of the process chamber 3, i.e., its upper surface. The working plate, which is not shown, also forms the bottom of the process chamber 3 and surrounds the building container 5 preferably on all sides. The working plane 16 is spaced from a ceiling 4*a* of the chamber wall 4 by a process chamber height T. In the case that the process chamber height T is not formed to be uniform over the entire region of the process chamber, for example due to a non-uniform height level of the process chamber ceiling 4*a*, e.g. due to slopes, and/or a lowered region of the working plate, for example, the process chamber height T can be defined as the maximum clear height of the process chamber.

An x-y plane of a Cartesian coordinate system is defined by the plane of the build area 10 or the working plane 16, wherein the y-direction in the device shown in FIG. 1 corresponds to the movement direction H of a recoater 14 (see below). The z-direction of the Cartesian coordinate system is defined by the process chamber height T.

In FIG. 1, the object 2 to be formed in the building container 5 on the building platform 9 is shown below the working plane 16 in an intermediate state with several solidified layers surrounded by building material 13 that has remained unsolidified.

To generate a gas flow 33 in the process chamber 3, the chamber wall 4 comprises a gas inlet 32 for introducing the gas flow into the process chamber, and a gas inlet 34 for discharging the gas flow. In FIG. 1, the gas inlet 32 and the gas outlet 34 are provided spaced apart in the x-direction on opposite sides of the chamber wall 4, with the build area 10 being provided between the gas inlet 32 and the gas outlet 34. The gas inlet 32 and the gas outlet 34 are provided in a lower height region of the process chamber 3, for example within a region of the process chamber 3 adjacent to the build area 10, which comprises a height extension of 20% or 10% of the process chamber height T. Here, the gas inlet 21 and the gas outlet 34 do not need to abut the working plane 16, but can also be spaced apart from the working plane, i.e. arranged vertically above it.

In FIG. 1, the gas inlet 32 and the gas outlet 34 are shown flush with the chamber wall 4, but they can also protrude into the process chamber 3 or be set back from the chamber wall 4.

The gas inlet 32 is in gas-conducting connection with a gas supply device, for example in the form of a blower, that is not shown in the figures, via a supply line 30 and a flow modification element 31. The gas inlet 32 can in particular be formed by gas-conducting openings on a gas outlet side of the flow modification element 31, as described further below. The supply line 30 is provided outside the process chamber 3 in FIG. 1. In FIG. 1, the supply line 30 comprises a first supply line section 36 and a second supply line section 37, wherein the first supply line section 36 is provided upstream of the second supply line section 37. The first supply line section 36 is configured in FIG. 1 as a substantially vertically extending duct having a substantially constant cross-sectional area, for example a circular cross-section, but it can also have any other suitable shape and arrangement. The second supply line section 37 comprises, for example, a housing 37*a* (see FIGS. 2, 3), depicted in the figures as a substantially cuboidal housing, having a gas-conducting configuration inside the housing that is described in more detail below with reference to FIGS. 2 and 3. The flow modification element 31 adjoins the second supply line section 37, which flow modification element is described in more detail below with reference to FIGS. 4*a* to 6*b*.

Furthermore, the gas outlet 34 is in gas-conducting connection with the gas supply device, which is not shown, via a discharge line 35. Preferably, the supply line 30, the flow modification element 31, the process chamber 3 and the discharge line 35 together with the gas supply device form a substantially closed process gas circuit. In FIG. 1, only sections of the supply line 30 and the discharge line 35 are shown.

The gas used is preferably a protective gas that does not substantially react chemically with the building material (inert gas), such as nitrogen or argon, depending on the building material used.

The laser sintering device 1 also contains a storage container 12 for a building material in powder form 13 that can be melted or solidified by electromagnetic radiation and a recoater 14 movable in a horizontal direction H (y-direction) for applying the building material 13 within the build area 10. Preferably, the recoater 14 extends transverse to its movement direction over the entire region where building material is to be applied. In the device 1 shown in FIG. 1, the movement direction H of the recoater 14 extends into the drawing plane (indicated by a circle with a cross), but it can also extend out of the drawing plane. Preferably, the recoater 14 is arranged to be movable in two opposite directions in the device 1.

Optionally, a radiant heater not shown in FIG. 1 can be arranged in the process chamber 3, which serves to heat the applied building material 13. For example, an infrared heater can be provided as a radiant heater.

The laser sintering device 1 also contains a solidification device in the form of an exposure device 20 having a laser 21 that generates a laser beam 22 that is deflected by a deflection device 23 and directed onto the working plane 16 by a focusing device 24, for example an F-theta lens, via a coupling window 15 arranged in the ceiling 4*a* of the chamber wall 4.

Furthermore, the laser sintering device 1 contains a control unit 29, via which the individual components of the device 1 are controlled in a coordinated manner to carry out the building process. Alternatively, the control unit can also be partially or completely arranged outside the device. In particular, the term "control unit" refers to any computer-based control device capable of controlling the operation of the additive device or a component thereof. For example, the control unit can be a computer. The control unit may include a CPU whose operation is controlled by a computer program (software). The computer program may be stored separately from the additive manufacturing device in a storage device, from where it can be loaded e.g. via a network or by wireless transmission into the additive manufacturing device, in particular into the control unit.

Various types of powder can be used as a building material, in particular metal powders, plastic powders, ceramic powders, sand, filled or mixed powders. Instead of powder, other suitable materials can also be used as a building material.

Figure 2:
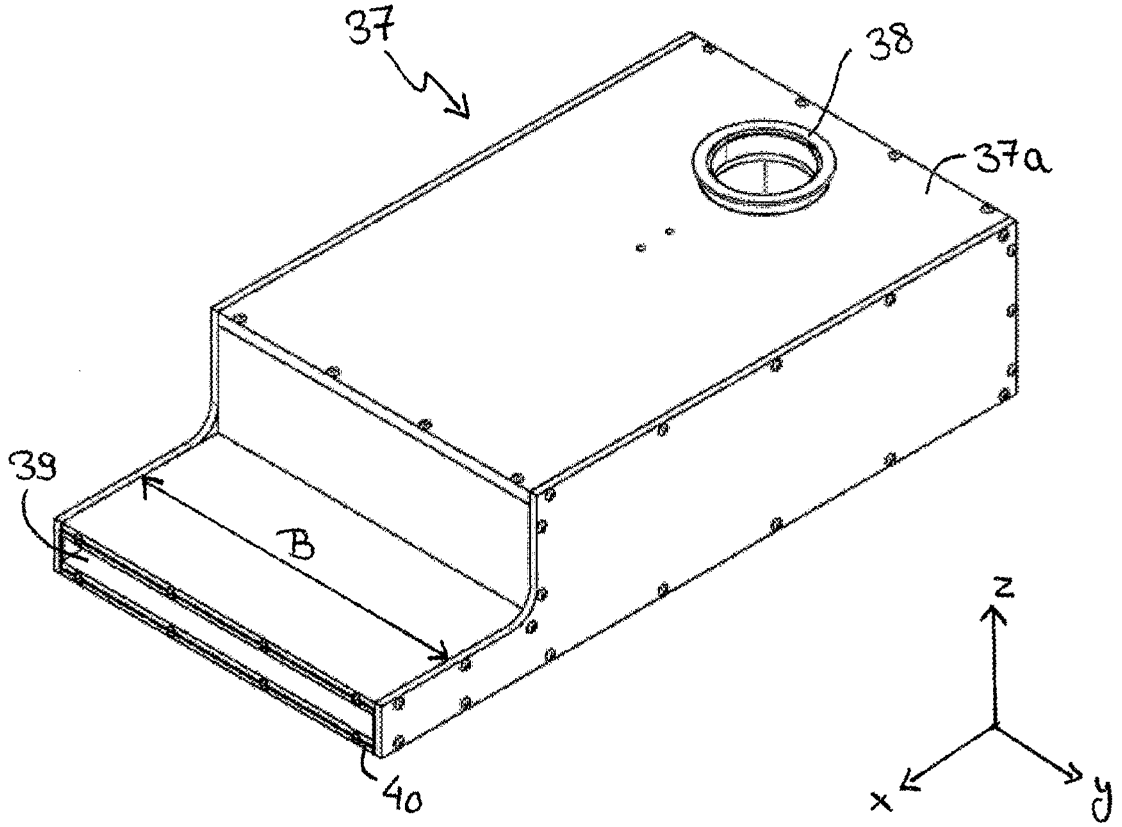
FIG. 2 shows a schematic perspective view of a supply line of the device shown in FIG. 1.
Figure 3:
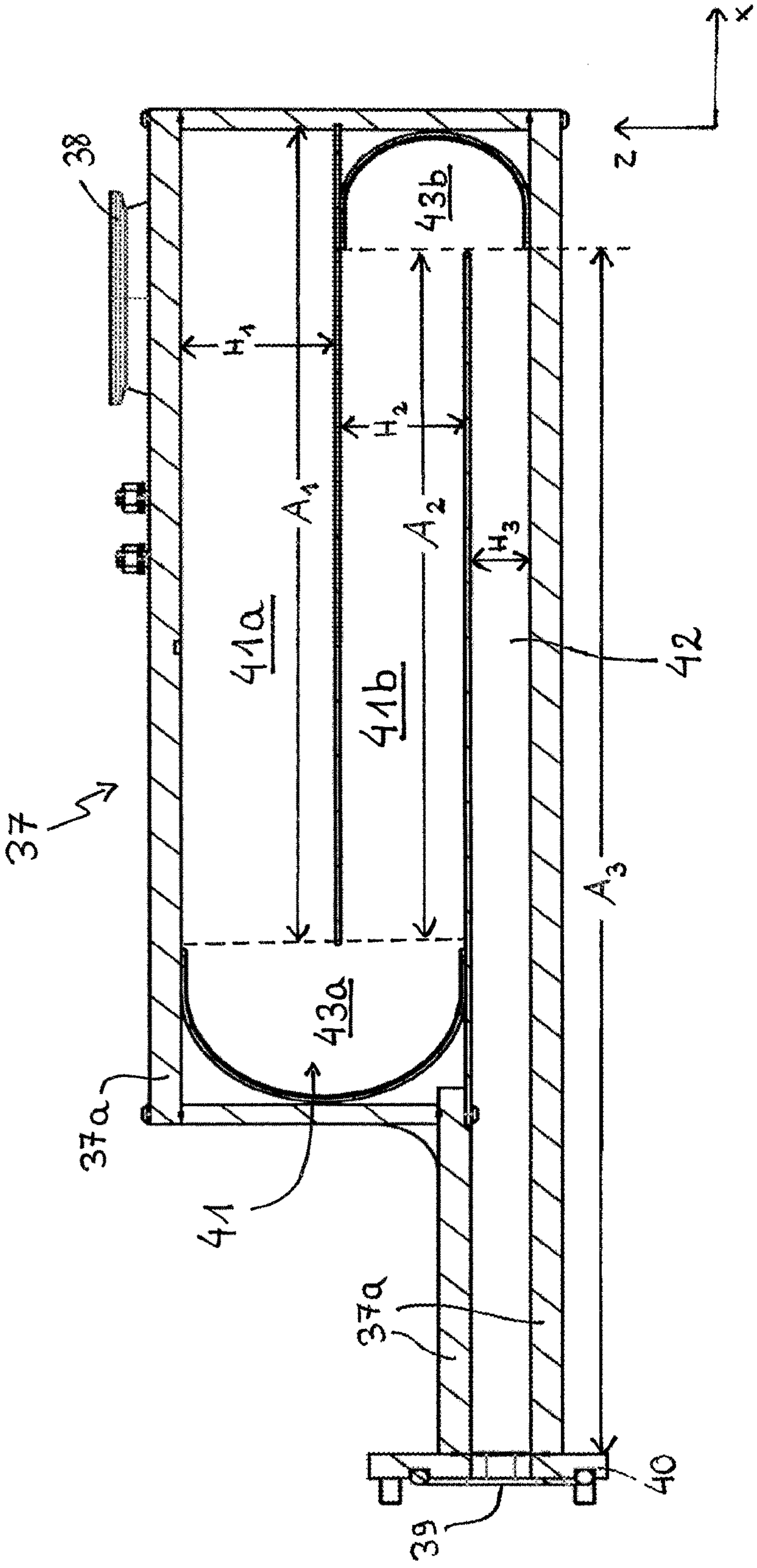
FIG. 3 shows a schematic view of the supply line shown in FIG. 2 in cross-section.

In the following, the supply line 30 is described in more detail with reference to FIGS. 2 and 3, wherein FIG. 2 shows a perspective view of the second supply line section 37 and FIG. 3 shows a view of the second supply line section 37 in cross-section. The cross-sectional plane in FIG. 3 extends parallel to the x-z-plane, i.e. perpendicular to the build area 10 in FIG. 1.

As described above, the second supply line section 37 is formed as a substantially cuboidal housing 37*a*. For supplying the gas from the first supply line section 36 (see FIG. 1), the housing 37*a* comprises a connecting element 38 configured to be connected to the first supply line section 36. A geometric shape of the connecting element 38 preferably corresponds to a geometric shape of an adjoining portion of the first supply line section 36, for example the connecting element 38 is formed as a circular opening. The connecting element 38 preferably comprises attachment elements that are not shown in detail in the figures for attaching the first supply line section 36 thereto, or it is configured integrally with the first supply line section 36.

A gas conducting connection is provided within the housing 37*a*, the connection comprising a first line section 41 and a second line section 42 (see FIG. 3), to conduct gas from the connecting element 38 to a gas outlet 39 of the second supply line section 37. An attachment element 40 is provided at the gas outlet 39 for attaching the flow modification element 31 (see FIG. 1) to the supply line.

The first line section 41 is spaced from the gas outlet 39 of the second supply line section 37 and thus from the flow modification element 31 (see FIG. 1) and preferably connects directly to the connecting element 38. The second line section 42 is provided between the first line section 41 and the gas outlet 39 or the flow modification element 31 (see FIG. 1), preferably connecting directly to the first line section 41 and the gas outlet 39 or the flow modification element 31.

The second line section 42 extends along a first extension direction that is substantially parallel to a plane of the build area 10 in FIG. 1 and preferably extends parallel to the x-direction over a length $A_3$. Transverse, preferably perpendicular, to the first extension direction and perpendicular to the plane of the build area 10 in FIG. 1, i.e. in the y-z-plane, the second line section 42 has a substantially rectangular cross-section. The cross-section has a width B in the y-direction, i.e. parallel to the build area 10 in FIG. 1, and has a height $H_3$ in the z-direction. The width B of the second line section 42 preferably corresponds to at least a maximum dimension of the build area 10 in the y-direction (see FIG. 1). The cross-section, and thus the width B and height $H_3$, is preferably constant over the entire length $A_3$ of the second line section 41 and corresponds to a cross-section of the flow modification element or the gas-permeable opening area of the flow modification element 31 on its gas inlet side (see below). The length $A_3$ of the second line section 42 is at least as great as five times, preferably at least as great as ten times, its height $H_3$. The length $A_3$ of the second line section 42 is at least as great as half its width B, preferably several times, in particular at least three times, greater than the width B of the second line section 42.

The first line section 41 shown in the figures is formed substantially in an s-shape in the x-z plane. In detail, the first line section 41 in the present embodiment comprises a first sub-section 41*a* and a second sub-section 41*b*, which are arranged substantially parallel to each other and one above the other in the z-direction. The first sub-section 41*a* and the second sub-section 41*b* are in gas-conducting connection with one another via a curved sub-section 43*a* of the first line section. The second sub-section 41*b* is in gas-conducting connection with the adjoining second line section 42 via a further curved sub-section 43*b*.

In the figures, the first and second sub-sections 41*a*, 41*b* extend over a first length $A_1$ and a second length $A_2$, respectively, parallel to the first extension direction (x-direction) of the second line section 42. A cross-section of the first and second sub-sections 41*a*, 41*b* perpendicular to the first extension direction, i.e. parallel to the y-z-plane, is rectangular in the present embodiment. The width B of the first and second sub-sections 41*a*, 41*b*, as well as of the curved sub-sections 43_a_, 43_b_, can be constant over the entire length of the first line section 41 and in particular equal to the width B of the second line section 42. However, it can also vary over the length of the first line section 41, wherein it is preferred that the width of the first line section 41 is substantially constant and equal to the width B of the second line section 42 at least in a sub-section adjoining the second line section 42, which sub-section preferably comprises at least two thirds of a total length of the first line section 41. The total length of the first line section 41 comprises at least the first length $A_1$ and the second length $A_2$ of the sub-sections 41_a_, 41_b_. The total length of the first line section 41 is at least as great as three times, preferably ten times, the width B of the second line section 42.

In the z-direction, i.e. perpendicular to each of the length and width, the first line section 41 has a height which decreases from a region of the connecting element 38 towards the second line section 42. In FIG. 3, the height of the first line section decreases stepwise, with the first sub-section 41_a_ having a first height $H_1$ and the second sub-section 41_b_ having a second height $H_2$, wherein: $H_1>H_2>H_3$. Alternatively, the height of the first line section 41 can, for example, decrease continuously from an initial height to the height $H_3$ of the second line section 42, or it can be constant.

In the present embodiment, the first line section 41 is substantially formed in an S-shape parallel to the x-z-plane with mutually parallel sub-sections 41_a_, 41_b_ and curved sub-sections 43_a_, 43_b_. Alternatively, the first line section 41 can also be formed in a z-shape, for example, or the sub-sections 41_a_, 41_b_ can be arranged at an angle to the first extension direction of the second line section 42 and/or at an angle to the x-direction and/or not parallel with respect to one another. The first line section 41 can also be formed in an s-shape or z-shape in a plane other than the x-z-plane, for example.

Furthermore, the first line section can also be formed without a second sub-section 41_b_, i.e. it can, for example, comprise only a first sub-section 41_a_ and a curved line section, or more than two sub-sections 41_a_, 41_b_ connected to each another via respective curved sub-sections.

The second supply line section 37 can also be configured without the housing 37_a_, and can, for example, be formed by corresponding pipes. In the figures, the shape of the housing 37_a_ deviates from a cuboid shape in that an extension of the housing is provided in a lower portion of the cuboid, into which the second line section 42 extends. The housing 37_a_ can also deviate from the shape described herein.

In the following, with reference to FIGS. 4_a_-4_c_, 5_a_, 5_b_, 6_a_ and 6_b_, the flow modification element 31 shown in FIG. 1 is described in more detail. FIG. 4_a_ shows a perspective view of the flow modification element with a gas outlet side 142 pointing forwards in the view of FIG. 4_a_ and a gas inlet side 141 located at the rear in FIG. 4_a_. FIGS. 4_b_ and 4_c_ show the flow modification element 31 with a view onto the gas inlet side 141 (FIG. 4_b_) and the gas outlet side 142 (FIG. 4_c_). FIG. 5_a_ shows a perspective view of the flow modification element 31 in a cross-section taken along a height h of the flow modification element 31 (line A-A in FIG. 4_a_), and FIG. 6_a_ shows a view of the flow modification element 31 in a cross-section taken along a width b of the flow modification element 131 (line C-C in FIG. 4_a_), wherein both cross-sectional planes of FIGS. 5_a_ and 6_a_ extend parallel to an extension of the flow modification element 31 from its gas inlet side 141 to its gas outlet side 142, i.e. its length L.

When the flow modification element 31 is installed, the gas inlet side 141 faces the supply line 30 or the second line section 42 (see FIGS. 1, 3), and the gas outlet side 142 faces away from the supply line 30 and towards the interior of the process chamber 3 (see FIG. 1). Thus, when installed, the flow modification element 31 extends along its length L from the gas inlet side 141 to the gas outlet side 142 preferably in the x-direction. The flow modification element 31 comprises a plurality of channels 143_a_, 143_b_, 143_c_, which are at least partially bounded by horizontal and vertical gas guide elements, as well as a wall 31_a_ of the flow modification element 31, and which allow gas to be transported from the gas inlet side 141 to the gas outlet side 142. Laterally, e.g. in the direction of the width b, the flow modification element 31 comprises optional attachment devices 147 for attaching the flow modification element to the chamber wall 4 of the process chamber 3 (see FIG. 1) and/or to the supply line 30 (see FIGS. 2, 3).

In detail, the channels 143_a_, 143_b_, 143_c_ in the flow modification element 31 shown in FIGS. 4_a_ to 6_b_ are arranged above one another and next to each other in rows and columns, i.e. the flow modification element 31 comprises a row of first channels 143_a_, a row of second channels 143_b_ and a row of third channels 143_c_. With respect to the build area 10, i.e. when the flow modification element 31 is installed in the device 1 in FIG. 1, the first channels 143_a_ are the upper channels in the vertical direction (z-direction), i.e. furthest away from the build area 10, and the third channels 143_c_ are the lowermost channels, i.e. closest to the build area 10, and the second channels 143_b_ are arranged as middle channels between the first channels 143_a_ and the third channels 143_c_. A first gas guide element 144_a_ is provided between the first channels 143_a_ and the second channels 143_b_, which delimits the first (upper) channels 143_a_ in a downward direction and delimits the second (middle) channels 143_b_ in an upward direction. Further, a second gas guide element 144_b_ is provided between the second channels 143_b_ and the third channels 143_c_, which delimits the second (middle) channels 143_b_ in the downward direction and delimits the third (lower) channels 143_c_ in the upward direction. In the present embodiment, the first channels 143_a_ are bounded in the upward direction by the wall 31_a_ of the flow modification element 31 and the third channels 143_c_ are bounded in the downward direction by the wall 31_a_. In the present embodiment, the first and second gas guide elements 144_a_, 144_b_ extend substantially over the entire length L from the gas inlet side 141 to the gas outlet side 142 (i.e. in the x-direction) of the flow modification element 31 (see FIG. 5_a_) and in the y-direction over the entire width b of the flow modification element 31 (see FIGS. 4_a_-4_c_). The first and second gas guide elements 144_a_, 144_b_ are thus substantially horizontally arranged gas guide elements.

Between adjacent channels of a row of channels, a third gas guide element 144_c_ is provided in each case, which delimits respective adjacent channels along the width b of the flow modification element (y-direction) at least partially, and possibly together with the wall 31_a_ of the flow modification element 31. In the present embodiment, the third gas guide elements 144_c_ do not extend over the entire length L of the flow modification element 31, but only over a section of the length L, from the gas inlet side 141 to the gas outlet side 142 (i.e. in the x-direction) of the flow modification element 31 (see FIG. 6_a_ and the explanations below), and in the z-direction over the entire height h of the flow modification element 31 (see FIGS. 4_a_-4_c_). The third gas guide elements 144_c_ are thus substantially vertically arranged gas guide elements.

The shape of the horizontal gas guide elements 144_a_, 144_b_ is described in more detail below with reference to FIGS. 5*a* and 5*b*, and the shape of the vertical gas guide elements 144*c* with reference to FIGS. 6*a* and 6*b*.

Figure 5A:
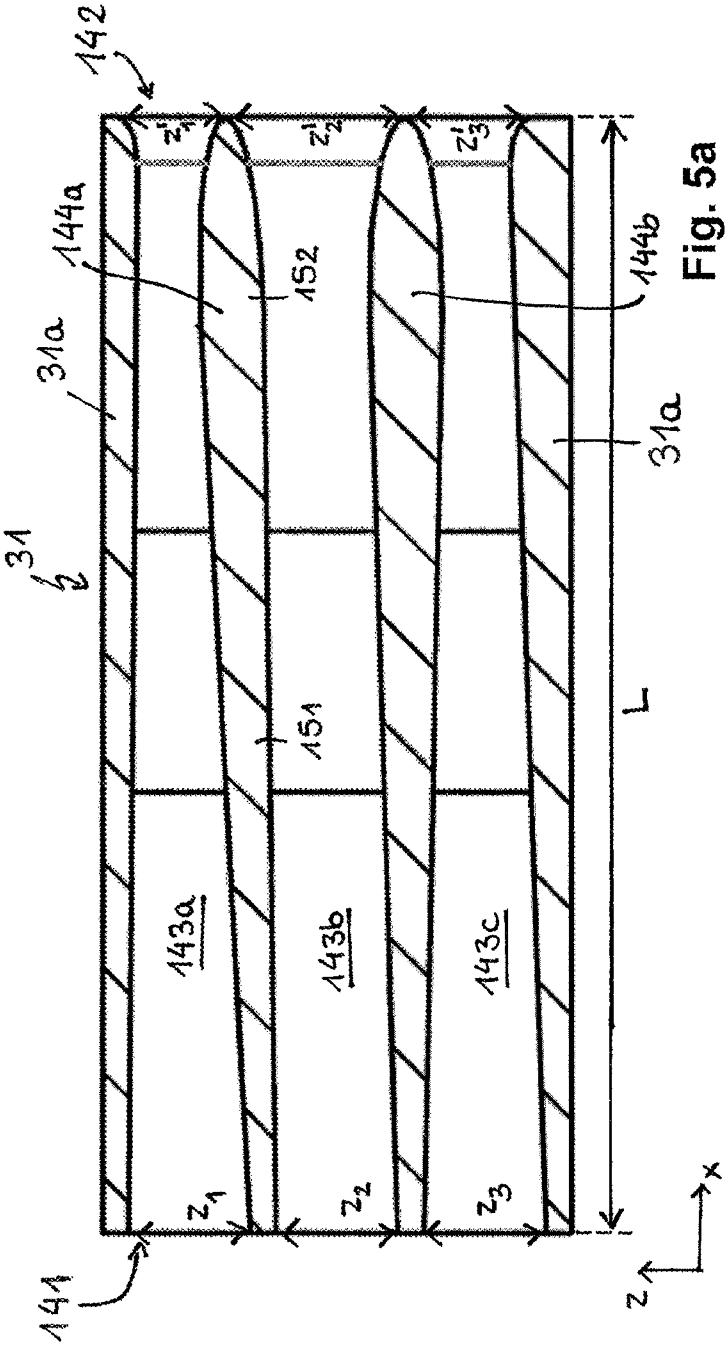
FIG. 5*a* shows a schematic view of the flow modification element shown in FIGS. 4*a*-4*c* in cross-section, with the cross-sectional plane extending along line A-A shown in FIG. 4*a*, FIG. 5*b* schematically shows an enlarged portion of a gas guide element shown in FIG. 5*a* in cross-section.
Figure 5B:
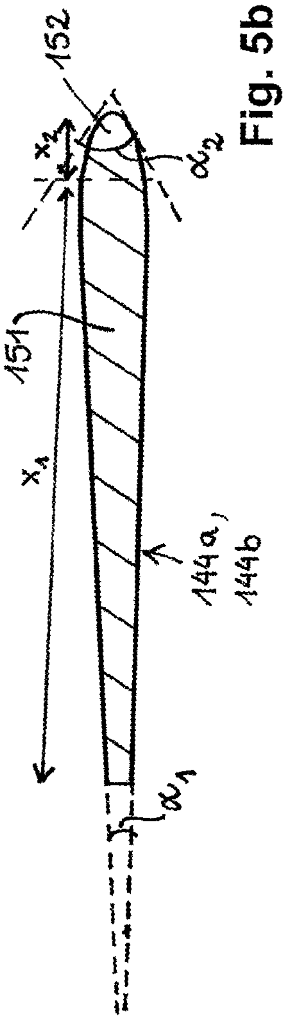

As shown in FIGS. 5*a*, 5*b*, the first and second gas guide elements 144*a*, 144*b* each comprise, perpendicular to their longitudinal extension (i.e. in a plane parallel to the x-z plane), a first portion 151 adjoining the gas inlet side 141 and a second portion 152 adjoining the gas outlet side 142. The first portion 151 extends from the inlet side 141 in the direction of the outlet side 142 over a first extension $x_1$ and has a shape tapering towards the gas inlet side 141 with a first expansion angle $\alpha_1$. The second portion 152 extends from the direction of the inlet side 141 to the outlet side 142 over a second extension $x_2$ and has a shape tapering towards the gas outlet side 142 with a second expansion angle $\alpha_2$. The first extension $x_1$ of the first portion 151 is greater than the second extension $x_2$ of the second portion 152, and the first expansion angle $\alpha_1$ of the first portion 151 is smaller than the second expansion angle $\alpha_2$ of the second portion 152. The expansion angles can, for example, be in the range of 1° to 3°. The expansion angles $\alpha_1$, $\alpha_2$ can, for example, be defined as the angle that the tangents to the top side and the bottom side of the gas guide elements 144*a*, 144*b* form with each other. Alternatively, the expansion angles can be defined, for example, as an angle that the average slopes of the top side and the bottom side of the gas guide elements form with each other. Preferably, the first and second gas guide elements 144*a*, 144*b* are each formed entirely by the first portion 151 and the second portion 152 and extend over the entire length L of the flow modification element 31, i.e. $L=x_1+x_2$. FIG. 5*b* alternatively shows the first or the second gas guide element 144*a*, 144*b*, although these are generally not configured identically, but differ from one another in their geometric shape and, for example, their expansion angles.

Figure 6A:
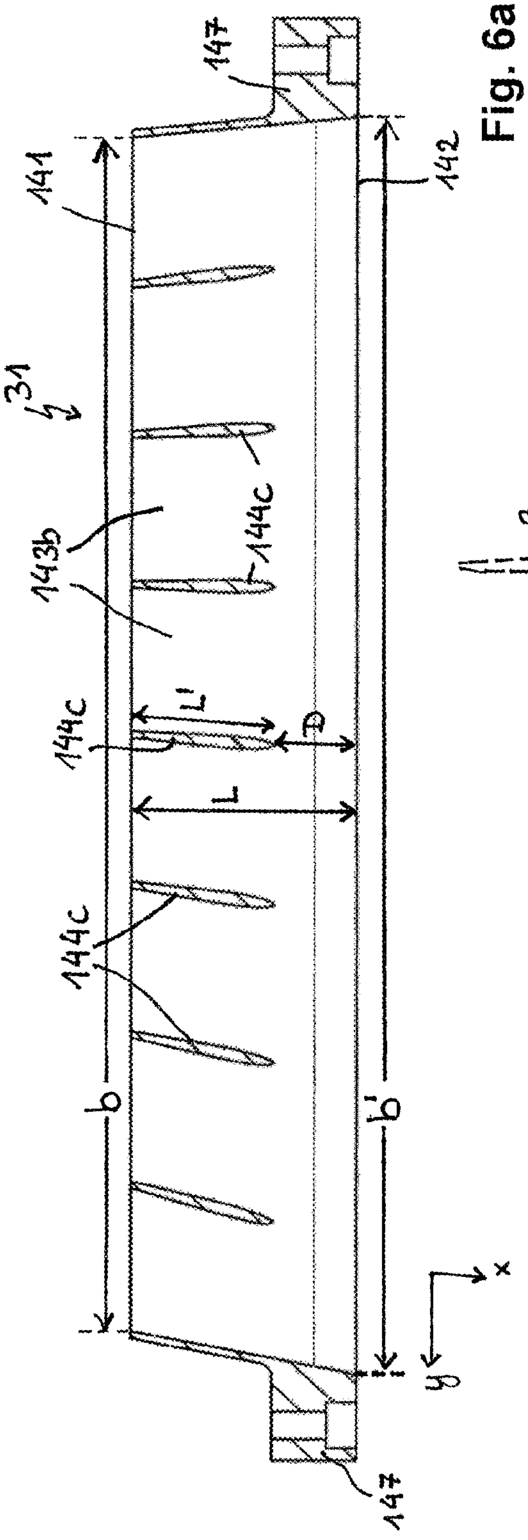
FIG. 6*a* shows a schematic view of the flow modification element shown in FIGS. 4*a*-4*c* in cross-section, with the cross-sectional plane extending along line C-C shown in FIG. 4*a*, FIG. 6*b* schematically shows an enlarged portion of a gas guide element shown in FIG. 6*a* in cross-section.
Figure 6B:
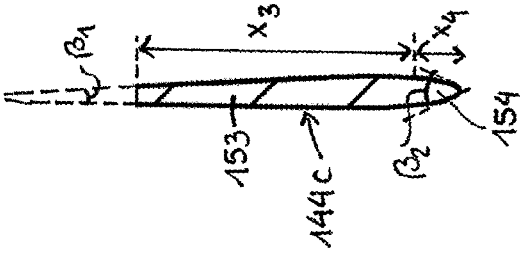

As shown in FIGS. 6*a*, 6*b*, the third gas guide elements 144*c* have an extension parallel to the build area 10, i.e. parallel to the x-y plane, between the gas inlet side 141 and the gas outlet side 142 (i.e. in the x-direction) that is smaller than the length L of the flow modification element 31. More precisely, the third gas guide elements 144*c* each extend, starting at the gas inlet side 141, in the direction of the gas outlet side 142 over a length L' that is smaller than the length L of the flow modification element, so that they end at a distance D=L−L' from the gas outlet side 142. Preferably, the length L' of the third gas guide elements 144*c* is at most two thirds of the length L of the flow modification element 31.

Analogous to the configuration of the first and second gas guide elements 144*a*, 144*c* (see above), the third gas guide element 144*c* in the cross-sectional view of FIGS. 6*a*, 6*b* also comprises a first portion 153 adjacent to the gas inlet side and a second portion 154 provided downstream of the first portion 153 in the direction of flow through the flow modification element 31, which each extend over a first extension $x_3$ and a second extension $x_4$, respectively, and together extend over the length $L'=x_3+x_4$ of the third gas guide element 144*c*. The first portion 153 has a shape tapering towards the gas inlet side 141 with a first expansion angle $\beta_1$, and the second portion 154 has a shape tapering towards the gas outlet side 142 with a second expansion angle $\beta_2$. Preferably, the second expansion angle $\beta_2$ of the second portion 154 is greater than the first expansion angle $\beta_1$ of the first portion 153, and the first extension $x_3$ of the first portion 153 is greater than the second extension $x_4$ of the second portion 154.

Optionally, a width b of the flow modification element 31 on the gas inlet side may differ from a width b' on the gas outlet side 142. In particular, the width b' on the gas outlet side 142 may be greater than the width b on the gas inlet side.

Figure 4A:
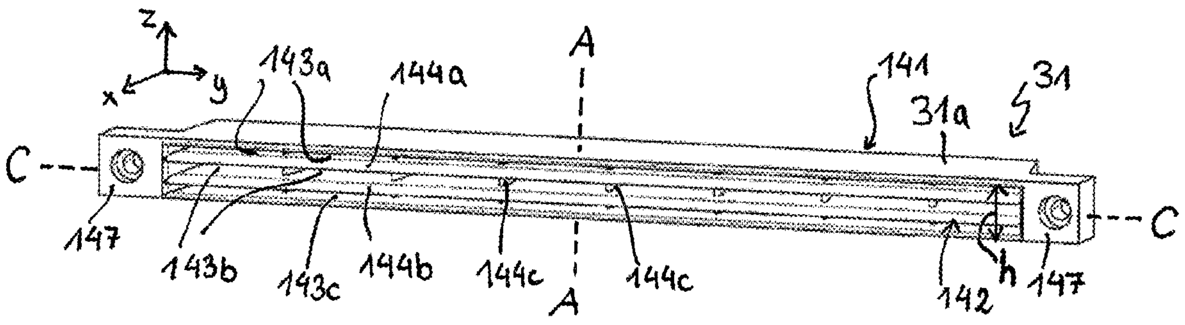
Figure 4B:
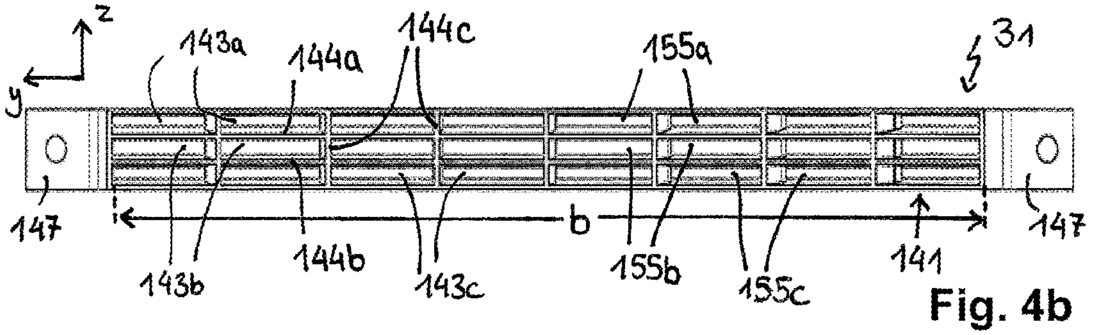
Figure 4C:
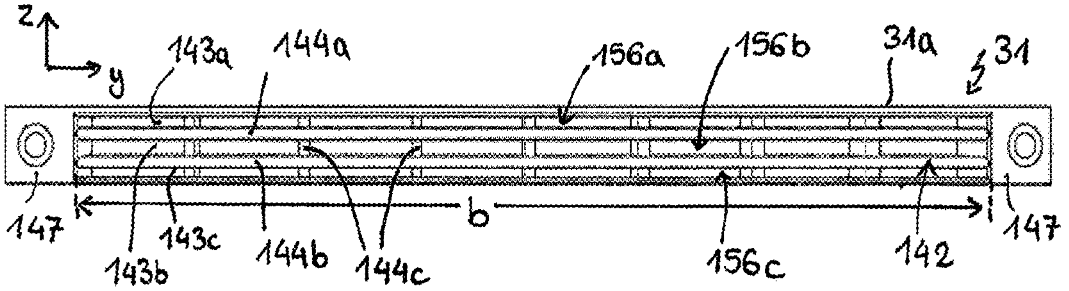

Each first channel 143*a* has an inlet opening 155*a* (see FIG. 4*b*) on the gas inlet side 141. Similarly, the second and third channels 143*b*, 143*c* have respective inlet openings 155*b* and 155*c* on the gas inlet side (FIGS. 4*b*, 4*c*). The inlet openings 155*a-c*, 156*a-c* are bounded by the gas guide elements 144*a-c* and possibly the wall 31*a*. The inlet openings have respective opening cross-sectional areas in a plane of the gas inlet side 141, and/or in the y-z-plane. In FIG. 5*a*, the opening cross-sectional areas of the first, second and third channels 143*a*, 143*b*, 143*c* on the gas inlet side 141 are represented by respective heights $z_1$, $z_2$ and $z_3$ of the channels in the z-direction. A total opening cross-sectional area of the row of first channels 143*a* on the gas inlet side 141 is the sum of the opening cross-sectional areas of the inlet openings 155*a* of the first channels 143*a*. Similarly, total opening cross-sectional areas of the rows of second and third channels 143*b*, 143*c* on the gas inlet side are defined.

On the gas outlet side 142, a total opening cross-sectional area of the row of first channels 143*a* is defined by the outlet opening 156*a* (see FIG. 4*c*), which is formed by the first gas guide element 144*a* and the upper wall 31*a* of the flow modification element 31 on the gas outlet side 142. In FIG. 5*a*, the total opening cross-sectional area of the row of first channels 143*a* is represented by the height $z_1'$, i.e. the distance between the wall 31*a* and the first gas guide element 144*a* in the z-direction. Similarly, total opening cross-sectional areas of the row of second and third channels 143*b*, 143*c* are defined by respective outlet openings 156*b*, 156*c* on the gas outlet side (see FIG. 4*c*), wherein the outlet openings 156*b*, 156*c* are formed by the first and second gas guide elements 144*a*, 144*b*, or the second gas guide element 144*b* and the lower wall 31*a* on the gas outlet side 142, and are represented in FIG. 5*a* by respective heights $z_2'$ and $z_3'$. The outlet openings 156*a*, 156*b*, 156*c* can, for example, be formed to be elongated and/or slit-shaped. Preferably, they each extend over the entire width b' of the flow modification element 31 on the gas outlet side 142.

As shown in FIGS. 4*b* and 5*a*, the first gas guide element 144*a* and the second gas guide element 144*b* are configured such that the total opening cross-sectional areas of the rows of first, second and third channels 143*a*, 143*b* and 143*c* on the gas inlet side 141 are substantially equal in size, represented in FIG. 5*a* by substantially equal heights $z_1$, $z_2$ and $z_3$ of the channels on the gas inlet side 141.

As shown in FIGS. 4*c* and 5*a*, the first gas guide element 144*a* and the second gas guide element 144*b*, and preferably additionally the wall 31*a*, are configured such that the total opening cross-sectional areas of the rows of first, second and third channels 143*a*, 143*b* and 143*c* differ from one another on the gas outlet side 142, depicted in FIG. 5*a* by different heights $z_1'$, $z_2'$ and $z_3'$. In detail, the total opening cross-sectional area of the second (middle) channels 143*b* is larger than the respective total opening cross-sectional area of the first (upper) channels 143*a* and the third (lower) channels 143*c* on the gas outlet side 142, in FIG. 5*a*: $z_2'>z_1'$ and $z_2'>z_3'$. For example, on the gas outlet side, a total opening cross-sectional area of the first (upper) channels 143*a* or the third (lower) channels 143*c* can be between 50% and 70% of the total opening cross-sectional area of the second (middle) channels 143*b*. The total opening cross-sectional areas of the first (upper) channels 143*a* and the third (lower) channels 143*c* on the gas outlet side 142 may be substantially the same or may differ from each other.

For each row of channels 143*a-c*, the respective total opening cross-sectional area on the gas inlet side 141 is preferably larger than on the gas outlet side 142.

Figure 7A:
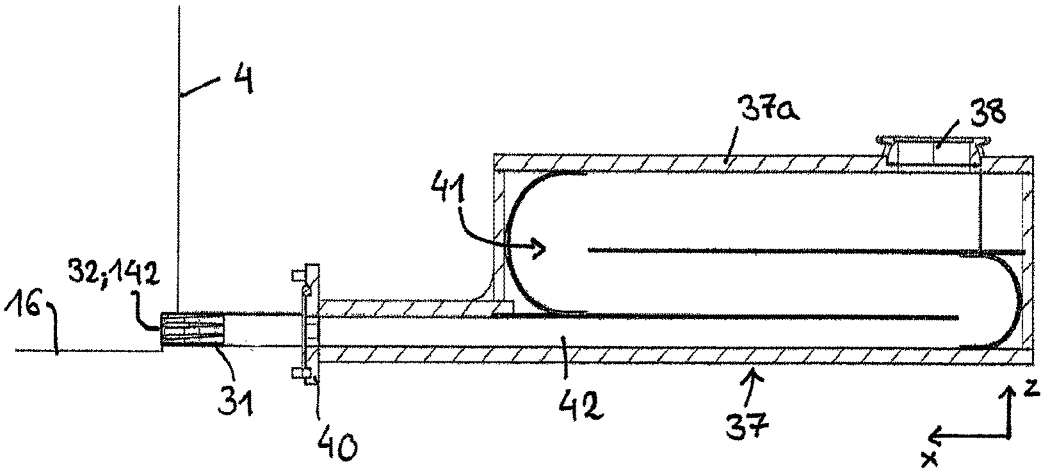
FIG. 7*a* shows a view of a portion of the manufacturing device shown in FIG. 1 in cross-section, with sections of a process chamber wall and the supply line shown in FIGS. 2 and 3, and with the flow modification element shown in FIGS. 4*a* to 6*b*.
Figure 7B:
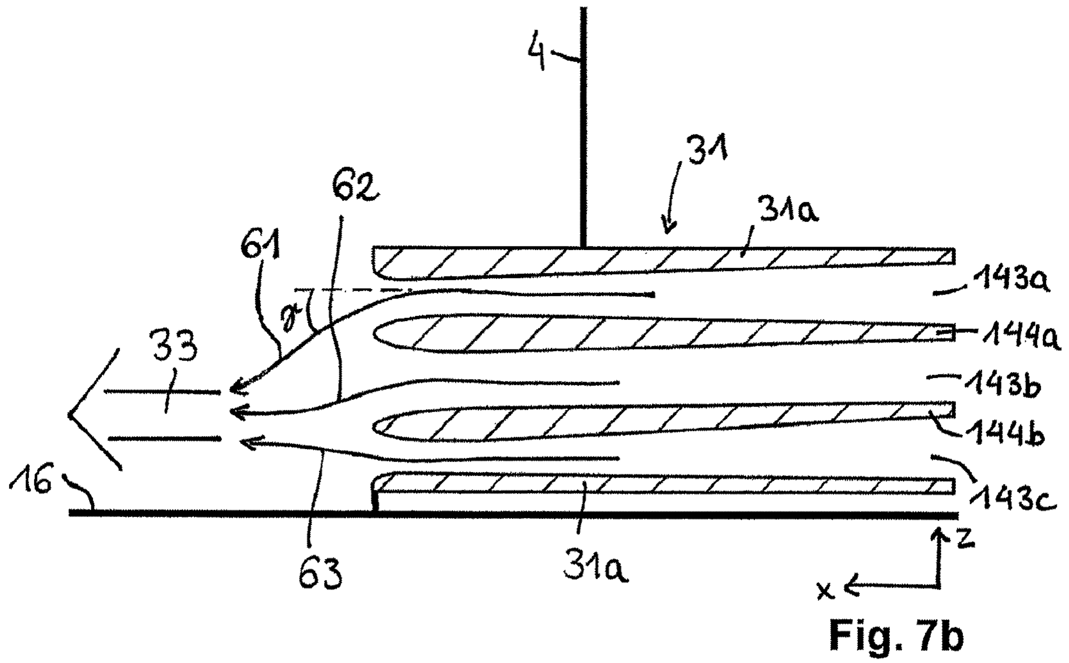
FIG. 7*b* shows, in cross-section, a view of a portion of the flow modification element depicted in more detail in FIGS. 4*a* to 6*b* and a section of the process chamber of the device shown in FIG. 1 during operation of the flow device.

Further, the first gas guide element 144*a*, and possibly the wall 31*a* delimiting the row of first channels 143*a*, is configured such that a first partial gas flow 61 that is introduced from the first channels 143*a* into the process chamber 3 during operation is directed towards the working plane 16 or towards the plane of the build area 10, as shown in FIG. 7*b*. The first gas guide element 144*a*, the second gas guide element 144*b*, and possibly the wall 31*a* delimiting the third channels 143*c* are configured such that a second partial gas flow 62 and a third partial gas flow 63 (see FIG. 7*b*), which are introduced during operation through the second channels 143*b* and third channels 143*c*, flow in substantially horizontally, i.e. in the x-direction, or have at least a smaller upwardly or downwardly pointing directional component than the first partial gas flow 61 flowing in through the first channels 143*a*.

For example, an angle γ formed by the incoming first partial gas flow 61 and the x-direction can be approximately 30°.

The flow modification element 31, or at least the gas guide elements 144*a*, 144*b*, 144*c*, can, for example, be an object manufactured in an additive manufacturing process.

In the present embodiment, the flow modification element 31 comprises seven third (vertical) gas guide elements 144*c*, so that each row of channels is formed by a total of eight channels (see FIGS. 4*a*-4*c*, 6*a*). However, the flow modification element 31 can also comprise more or less than seven third gas guide elements or can be formed without the third gas guide element. Similarly, instead of the two horizontal gas guide elements (first and second gas guide elements 144*a*, 144*b*), the flow modification element 31 can comprise only a single horizontal gas guide element, or more than two horizontal gas guide elements, and accordingly a number of rows of channels other than two.

FIG. 7*a* shows a portion of the device 1 shown in FIG. 1 in a cross-sectional view perpendicular to the build area with sections of the chamber wall 4, the first and second supply line sections 41, 42 of the supply line in the housing 37*a*, and with the flow modification element 31. In FIG. 7*a*, the gas outlet side 142 of the flow modification element 31 is arranged offset from a plane of the chamber wall 4 into the process chamber, and the outlet openings 156*a-c* (see FIG. 4*c*; not shown in FIG. 7*a*) form the gas inlet 32 through which the gas flows into the process chamber 3 during operation of the flow device. The flow modification element 31 connects directly to the second line section 42 of the supply line.

The operation of the laser sintering or laser melting device 1 is described below with reference to FIGS. 1 to 7*b*. First, in order to apply a powder layer, the support 7 is lowered by a height corresponding to the desired layer thickness. The recoater 14 moves to the storage container 12 and receives from it an amount of the building material 13 sufficient for applying a layer. The storage container 12 does not have to be arranged above the working plane 16, as shown in FIG. 1, but can also be arranged below it, and can, for example, be configured as a metering plunger that supplies a certain amount of the building material 13 to the recoater 14 in each case. The recoater 14 then moves across the build area 10, there applies building material 13 onto the building base or an already existing powder layer and draws it out to form a powder layer. Application takes place at least over the entire cross-section of the object to be manufactured 2, preferably over the entire build area 10, i.e. the region bounded by the container wall 6. Optionally, the applied building material is heated to a working temperature by a radiant heater (not shown).

The cross-section of the object 2 to be manufactured is then scanned by the laser beam 22 so that the building material 13 in powder form is solidified at locations that correspond to the cross-section of the object 2 to be manufactured. In doing so, the powder grains are partially or completely melted at these locations by the energy introduced by the radiation so that they are present joined together as a solid body after cooling. These steps are repeated until the object 2 is completed and can be removed from the process chamber 3.

During the layer-wise building of the object 2, a gas is at least intermittently introduced into the process chamber 3 by the gas supply device (not shown) through the supply line 30 and the flow modification element 31 through the gas inlet 32 and is discharged from or sucked out of the process chamber 3 again through the gas outlet 34 and the discharge line 35 so that a gas flow 33 is generated in the process chamber 3. The gas flow flows through the process chamber above the working plane 16 at least along the build area 10. In doing so, the gas enters the process chamber in the form of partial gas inlet flows, with the first partial gas flow 61 being introduced through the first row of channels 143*a* and the second and third partial gas flows 62, 63 being introduced through the second and third rows of channels 143*b*, 143, respectively. As described further above, the first (upper) partial gas flow 61 exits the row of first (upper) channels 143*a* at a downward angle towards the build area 10. As a result, the entire gas flow 33 formed by the partial gas flows 61, 62, 63 is also directed towards the plane of the build area 10 at least initially, i.e. after the gas has been introduced into the process chamber, and/or a concentration of the partial gas flows 61, 62, 63 can be achieved. This can, for example, achieve good removal of impurities directly at their point of origin (the build area). Since the directional component is caused by the upper partial gas flow 61, for example, splitting of the entire gas flow 33 can be prevented, which can reduce turbulence in the gas flow 33.

In FIG. 7*b*, the directional components of the partial gas flows 61, 62 and 63 are shown purely schematically by arrows. However, the partial gas flows 61, 62 and 63 are not limited to these flow paths.

The present invention is not limited to the embodiment described above. For example, the flow modification element can also be used with a differently configured supply line instead of the supply line described with reference to FIGS. 1 to 3. Similarly, the supply line can also be used in combination with another gas inlet or a flow modification element other than that described with reference to FIGS. 4*a* to 6*b*, for example a grid, perforated plate, or the like.

The arrangement of the gas inlet and the flow modification element as well as the gas outlet is not limited to a lower height region of the process chamber. For example, the gas inlet and/or the flow modification element and/or the gas outlet may alternatively or additionally be provided in an upper height region of the process chamber. More than one gas inlet and/or more than one gas outlet may also be provided for introducing or discharging the gas flow.

Although the present invention has been described with reference to a laser sintering or laser melting device, it is not limited to laser sintering or laser melting. It can be applied to any method of additively manufacturing a three-dimensional object by layer-wise applying and selectively solidifying a building material.

For example, the exposure device may comprise one or more gas or solid-state lasers or any other type of laser such as laser diodes, in particular VCSEL (Vertical Cavity Surface Emitting Laser) or VECSEL (Vertical External Cavity Surface Emitting Laser), or a line of such lasers. In general, any device that can be used to selectively apply energy as wave or particle radiation to a layer of the building material can be used as an exposure device. For example, instead of a laser, another light source, an electron beam or any other source of energy or radiation capable of solidifying the building material may be used. Instead of deflecting a beam, exposure with a movable line exposure unit can also be used. The invention can also be applied to selective mask sintering, wherein an extended light source and a mask are used, or to high-speed sintering (HSS), wherein a material that increases (absorption sintering) or decreases (inhibition sintering) the radiation absorption at the corresponding locations is selectively applied to the building material and then exposed non-selectively over a large area or with a movable line exposure unit.

Instead of applying energy, the selective solidification of the applied building material can also be achieved by 3D printing, for example by applying an adhesive. In general, the invention relates to the additive manufacture of an object by layer-wise application and selective solidification of a building material, irrespective of the manner in which the building material is solidified.

The invention claimed is:

1. A flow device for a manufacturing device for additively manufacturing a three-dimensional object by selectively solidifying a building material layer by layer in a build area within a process chamber of the manufacturing device, wherein the flow device comprises:

a gas supply device for generating a gas flow at least in the process chamber, a supply line for supplying the gas flow to the process chamber, and a flow modification element for introducing the gas flow from the supply line into the process chamber, wherein the flow modification element comprises a gas inlet side facing the supply line, a gas outlet side facing away from the supply line, at least a first gas guide element extending from the gas inlet side to the gas outlet side and a plurality of channels, wherein each of the plurality of channels allows a transport of gas from the gas inlet side to the gas outlet side, wherein a number of first channels and a number of second channels are at least partially defined by the first gas guide element, which are spaced apart from one another such that the number of second channels is arranged closer to the build area in a direction perpendicular to the build area than the number of first channels, and wherein the first gas guide element is configured such that a total opening cross-sectional area associated with the number of first channels on the gas outlet side differs from a total opening cross-sectional area associated with the number of second channels on the gas outlet side, and a total opening cross-sectional area associated with the number of first channels on the gas inlet side and a total opening cross-sectional area associated with the number of second channels on the gas inlet side are substantially equal, and/or wherein the first gas guide element is configured such that at least a partial gas flow, which is introduced into the process chamber from the number of first channels during operation of the flow device, is directed towards a plane of the build area, and wherein the flow modification element further comprises at least one vertical gas guide element.

2. The flow device of claim 1, wherein the flow modification element further comprises a second gas guide element extending from the gas inlet side to the gas outlet side and at least partially defining a number of third channels, wherein the number of third channels is spaced apart from the number of first channels and the number of second channels such that the number of third channels is arranged closer to the build area than the number of second channels in a direction perpendicular to the build area.

3. The flow device of claim 2, wherein the first gas guide element and the second gas guide element are configured such that the total opening cross- sectional area associated with the number of second channels on the gas outlet side is greater than the total opening cross-sectional area associated with the number of first channels on the gas outlet side and/or a total opening cross-sectional area associated with the number of third channels on the gas outlet side, wherein the total opening cross-sectional area associated with the number of first channels on the gas inlet side and/or the total opening cross-sectional area associated with the number of second channels on the gas inlet side and/or the total opening cross-sectional area associated with the number of third channels on the gas inlet side is substantially equal, and/or wherein the first gas guide element and the second gas guide element are configured such that the total opening cross-sectional area associated with the number of first and/or second and/or third channels on the gas outlet side is in each case smaller than the total opening cross-sectional area associated with the number of first or second or third channels on the gas inlet side, respectively.

4. The flow device of claim 1, wherein the first and/or a second gas guide element comprises a first portion adjacent to the gas inlet side, which has a shape tapering towards the gas inlet side, and/or a second portion adjacent to the gas outlet side, which has a shape tapering towards the gas outlet side, wherein an extension of the first portion between the gas inlet side and the gas outlet side is greater than an extension of the second portion between the gas inlet side and the gas outlet side and/or wherein an expansion angle of the second portion is greater than an expansion angle of the first portion and/or wherein the first gas guide element and/or the second gas guide element extends over an entire extension of the flow modification element from the gas inlet side to the gas outlet side.

5. The flow device of claim 1, wherein the at least one vertical gas guide element is a third gas guide element extending substantially perpendicular to a plane of the build area, wherein a third gas guide element extends from the gas inlet side towards the gas outlet side of the flow modification element and ends at a distance from the gas outlet side, further wherein the third gas guide element extends over a length which corresponds to at most two thirds of an extension of the flow modification element from the gas inlet side to the gas outlet side.

6. The flow device of claim 5, wherein the third gas guide element comprises a first portion adjacent to the gas inlet side, which has a shape tapering towards the gas inlet side, and/or a second portion provided downstream of the first portion, which has a shape tapering towards the gas outlet side, wherein an extension of the first portion between the gas inlet side and the gas outlet side is greater than an extension of the second portion between the gas inlet side and the gas outlet side and/or wherein an expansion angle of the second portion is greater than an expansion angle of the first portion.

7. The flow device of claim 1, wherein the first and/or the second gas guide element is formed as a substantially horizontally arranged flat body and/or wherein the at least one vertical gas guide element is formed as a substantially vertically arranged flat body, wherein an entire flow modification element is manufactured in an additive manufacturing method.

8. The flow device of claim 1, wherein the flow modification element is provided substantially in a lower height region of the process chamber.

9. A manufacturing device for additively manufacturing a three-dimensional object by selectively solidifying a building material layer by layer in a build area within a process chamber, the manufacturing device comprising a flow device according to claim 1.

10. A flow modification element for a manufacturing device for additively manufacturing a three-dimensional object by selectively solidifying a building material layer by layer in a build area within a process chamber of the manufacturing device, wherein the flow modification element is configured to supply a gas flow from a supply line into the process chamber, wherein the flow modification element comprises a gas inlet side facing the supply line, a gas outlet side facing away from the supply line, at least a first gas guide element extending from the gas inlet side to the gas outlet side and a plurality of channels, wherein each of the plurality of channels allows a transport of gas from the gas inlet side to the gas outlet side, wherein a number of first channels and a number of second channels are at least partially defined by the first gas guide element, which are spaced apart from one another such that the number of second channels is arranged closer to the build area in a direction perpendicular to the build area than the number of first channels, and wherein the first gas guide element is configured such that a total opening cross-sectional area associated with the number of first channels on the gas outlet side differs from a total opening cross-sectional area associated with the number of second channels on the gas outlet side, and a total opening cross-sectional area associated with the number of first channels on the gas inlet side and a total opening cross-sectional area associated with the number of second channels on the gas inlet side are substantially equal, and/or wherein the first gas guide element is configured such that at least a partial gas flow, which is introduced into the process chamber from the number of first channels during operation of the flow modification element, is directed towards a plane of the build area, and wherein the flow modification element further comprises at least one vertical gas guide element.

11. A flow device for a manufacturing device for additively manufacturing a three-dimensional object by selectively solidifying a building material layer by layer in a build area within a process chamber of the manufacturing device, wherein the flow device comprises:

a gas supply device for generating a gas flow at least in the process chamber, a supply line for supplying the gas flow to the process chamber and a flow modification element for introducing the gas flow from the supply line into the process chamber, wherein the supply line comprises at least a first line section which is spaced from the flow modification element and which is formed substantially in an s-shape and/or z-shape, wherein the first line section comprises at least a first sub-section and at least a second sub-section, the first and second sub-sections each providing a straight line section for the gas flow and being arranged substantially parallel to one another, wherein the first and second sub-sections are in fluidic communication with one another via a curved sub-section of the first line section; and the supply line comprises at least a second line section, which is provided between the first line section and the flow modification element, directly adjoining the first line section and the flow modification element, respectively, and which extends along a first extension direction that is substantially parallel to a plane of the build area over a length that is at least as great as ten times, a height of the second line section transverse to the first extension direction and substantially perpendicular to a plane of the build area.

12. The flow device of claim 11, wherein the second line section extends along its first extension direction over a length that is at least as great as half a width of the second line section transverse to the first extension direction and substantially parallel to a plane of the build area, wherein the length of the second line section is at least three times greater than the width of the second line section.

13. The flow device of claim 11, wherein a total length of the first line section, which comprises at least a first length of the first sub-section and a second length of the second sub-section in a direction substantially parallel to the first extension direction, is at least as great as ten times a width of the flow modification element and/or of the second line section transverse to the first extension direction and substantially parallel to a plane of the build area.

14. The flow device of claim 11, wherein a cross-section of the second line section in a plane transverse to the first extension direction is substantially as large as a cross-section of the flow modification element at a gas inlet side of the flow modification element adjoining the second line section, and/or has a rectangular shape.

15. The flow device of claim 11, wherein, in a direction parallel to the plane of the build area, a width of at least a sub-section of the first line section adjoining the second line section is substantially equal to the width of the second line section, wherein the sub-section of the first line section comprises at least two thirds of a total extension of the first line section.

16. The flow device of claim 11, wherein in a direction perpendicular to the plane of the build area a height of the first line section decreases continuously or stepwise, and/or wherein a height of the second line section in a direction perpendicular to the plane of the build area is substantially constant.

17. A flow method for generating a gas flow in a manufacturing device or additively manufacturing a three-dimensional object by selectively solidifying a building material layer by layer in a build area within a process chamber of the manufacturing device, the flow method comprising:
generating a gas flow at least in the process chamber using a gas supply device,
supplying the gas flow to the process chamber via a supply line, and
introducing the gas flow from the supply line via a flow modification element into the process chamber,
wherein the flow modification element comprises a gas inlet side facing the supply line, a gas outlet side facing away from the supply line, at least a first gas guide element extending from the gas inlet side to the gas outlet side and a plurality of channels, wherein each of the plurality of channels allows a transport of gas from the gas inlet side to the gas outlet side,
wherein a number of first channels and a number of second channels are at least partially defined by the first gas guide element, which are spaced apart from one another such that the number of second channels is arranged closer to the build area in a direction perpendicular to the build area than the number of first channels, and
wherein the first gas guide element is configured such that a total opening cross-sectional area associated with the number of first channels on the gas outlet side differs from a total opening cross-sectional area associated with the number of second channels on the gas outlet side, and a total opening cross-sectional area associated with the number of first channels on the gas inlet side and a total opening cross-sectional area associated with the number of second channels on the gas inlet side are substantially equal, and/or
wherein the first gas guide element is configured such that at least a partial gas flow, which is introduced from the number of first channels into the process chamber during operation of the flow modification element, is directed towards a plane of the build area;
and wherein the flow modification element further comprises at least one vertical gas guide element.

18. A manufacturing method for additively manufacturing a three-dimensional object in a process chamber of a manufacturing device, the method comprising:
applying a building material layer by layer in a build area,
selectively solidifying the building material layer, and
repeating the steps of layer-wise applying and selectively solidifying until the three-dimensional object is completed,
wherein a flow method according to claim 17 is carried out at least temporarily during a manufacture of the three-dimensional object.

19. A flow method for generating a gas flow in a manufacturing device for additively manufacturing a three-dimensional object by selectively solidifying a building material layer by layer in a build area within a process chamber of the manufacturing device, the flow method comprising:
generating a gas flow at least within the process chamber using a gas supply device,
supplying the gas flow to the process chamber via a supply line, and
introducing the gas flow from the supply line via a flow modification element into the process chamber,
wherein the supply line comprises at least a first line section which is spaced from the flow modification element and which is formed substantially in an s-shape and/or z-shape, wherein the first line section comprises at least a first sub-section and at least a second sub-section, the first and second sub-sections each providing a straight line section for the gas flow and being arranged substantially parallel to one another. wherein the first and second sub-sections are in fluidic communication with one another via a curved sub-section of the first line section. and
the supply line comprises at least a second line section, which is provided directly adjoining the first line section and the flow modification element, respectively, and which extends along a first extension direction that is substantially parallel to a plane of the build area over a length that is at least as great as ten times a height of the second line section transverse to the first extension direction and substantially perpendicular to a plane of the build area.

20. A flow device for a manufacturing device for additively manufacturing a three-dimensional object by selectively solidifying a building material layer by layer in a build area within a process chamber of the manufacturing device,
wherein the flow device comprises:
a gas supply device for generating a gas flow at least in the process chamber,
a supply line for supplying the gas flow to the process chamber, and
a flow modification element for introducing the gas flow from the supply line into the process chamber,
wherein the flow modification element comprises a gas inlet side facing the supply line, a gas outlet side facing away from the supply line, at least a first horizontal gas guide element extending from the gas inlet side to the gas outlet side, the first horizontal gas guide element defining a number of first channels and a number of second channels spaced apart in a vertical direction, wherein each of the first and second channels allows a transport of gas from the gas inlet side to the gas outlet side,
wherein the first horizontal gas guide element is in a drop shape with a tip of the drop shape facing the gas inlet side when seen in a cross-section of the flow modification element.

* * * * *